United States Patent
Fujita et al.

(10) Patent No.: US 6,843,647 B2
(45) Date of Patent: Jan. 18, 2005

(54) ELECTRIC CLOSING GEAR

(75) Inventors: Saburo Fujita, Nagoya (JP); Junichi Yamamoto, Nagoya (JP); Tosimichi Sugita, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 174 days.

(21) Appl. No.: 10/239,846

(22) PCT Filed: Feb. 4, 2002

(86) PCT No.: PCT/JP02/00887

§ 371 (c)(1),
(2), (4) Date: Oct. 1, 2002

(87) PCT Pub. No.: WO02/062556

PCT Pub. Date: Aug. 15, 2002

(65) Prior Publication Data

US 2003/0190386 A1 Oct. 9, 2003

(30) Foreign Application Priority Data

Feb. 2, 2001 (JP) .................................. 2001-027095

(51) Int. Cl.[7] .............................................. B29C 45/64
(52) U.S. Cl. ................................. 425/589; 425/451.7
(58) Field of Search ............................... 425/589, 590, 425/595, 450.1, 451.2, 451.7, 451.9

(56) References Cited

U.S. PATENT DOCUMENTS

| | | | | |
|---|---|---|---|---|
| 5,192,557 A | * | 3/1993 | Hirata et al. | 425/589 |
| 5,352,394 A | * | 10/1994 | Fujita et al. | 425/589 |
| 5,356,279 A | * | 10/1994 | Fuller et al. | 425/589 |
| 5,547,367 A | * | 8/1996 | Stein | 425/589 |
| 5,776,516 A | * | 7/1998 | Armbruster et al. | 425/589 |
| 5,868,989 A | * | 2/1999 | Glaesener et al. | 425/589 |
| 5,912,020 A | * | 6/1999 | Grunitz | 425/595 |

FOREIGN PATENT DOCUMENTS

| | | |
|---|---|---|
| EP | 544903 | 6/1993 |
| JP | 62-87318 | 4/1987 |
| JP | 6-106542 | 4/1994 |
| JP | 8-276482 | 10/1996 |
| JP | 2531522 | 1/1997 |

* cited by examiner

Primary Examiner—James P. Mackey
(74) Attorney, Agent, or Firm—Oblon, Spivak, McClelland, Maier & Neustadt, P.C.

(57) ABSTRACT

A mechanism for advancing and retreating a movable die plate toward and from a fixed die plate includes a moving base in which the upper surface thereof is connected integrally with the movable die plate and a slide unit is installed on the lower surface thereof. A pair of track rails are provided on the base and form a linear guide by engaging with the slide unit. A ball screw shaft is supported in parallel with the track rails by a bearing provided on the base and has an axial direction restrained rotatably. A servomotor drives the ball screw shaft and a ball screw nut is installed on the lower surface of the moving base to threadedly engage with the ball screw shaft, and the ball screw shaft and the ball screw nut are provided at an arbitrary position between the paired track rails for linear guidance.

7 Claims, 3 Drawing Sheets

ELECTRIC CLOSING GEAR

TECHNICAL FIELD

The present invention relates to a mold opening/closing device for an injection molding machine and, more particularly, to a hydraulically and electrically operated composite mold opening/closing device in which mold clamping is performed by using a hydraulic cylinder and opening/closing movement of movable die plate is performed electrically.

BACKGROUND ART

In a mold opening/closing and mold clamping apparatus for an injection molding machine, mold clamping requires a strong force, while a strong force need not be used continuously for the movement of a movable die plate for opening/closing a mold, but the movement stroke of the movable die plate must be large to take out a product. Previously, the mold clamping and the movement of the movable die plate were performed with the same hydraulic cylinder. In this configuration, however, the hydraulic cylinder was required to have a large diameter and a long stroke, so that the movement of the movable die plate was slow, and the required quantity of oil was large, which caused a problem of poor economy. In recent years, an economical configuration has been used in which a hydraulic cylinder having a small diameter and a long stroke or mechanical movement means in which the rotational force of an electric motor is converted into a force in a straight direction is used for the movement of the die plate, while in the mold clamping process, a hydraulic cylinder having a large diameter and a short stroke is used.

A conventional example described in Japanese Patent Provisional Publication No. 62-87318 (No. 87318/1987) is a mold clamping apparatus including a fixed die plate holding a fixed mold; a movable die plate holding a movable mold; a ball-screw type feed mechanism which advances and retreats the movable die plate toward and from the fixed die plate by means of a driving force of a servomotor; and means for coupling and fixing the movable die plate to a mold clamping piston just before the movable die plate comes close to the fixed die plate and the fixed mold and movable mold are closed.

Also, a mold clamping apparatus described in Utility Model Registration No. 2531522 is provided with a ball-screw type feed mechanism for advancing and retreating the movable die plate toward and from the fixed die plate, which is similar to that mechanism described in the aforementioned Japanese Patent Provisional Publication No. 62-87318, and a tie bar connecting directly to the mold clamping piston for coupling and fixing the movable mold to the fixed mold, and also has means for connecting the movable die plate to the tie bar by engaging half nuts opening and closing in the direction substantially perpendicular to the tie bar provided on the movable die plate with ring grooves formed in the tie bar, so that after the movable die plate is connected to the tie bar, the mold clamping piston is operated hydraulically to pull the movable die plate nearer via the tie bar.

A ball screw of the above-described ball-screw type feed mechanism for advancing and retreating the movable die plate toward and from the fixed die plate has a two-speed mechanism consisting of a mechanism for directly transmitting the rotation of a motor shaft to a ball screw shaft and a mechanism for reducing the rotational speed of the motor shaft and transmitting the rotation thereof to the ball screw shaft, and switching between both mechanisms can be performed by an electromagnetic clutch, so that when a great force is required at the time of mold release, the rotational speed of motor shaft is reduced so that a high torque is applied to the ball screw. In order to balance the load to the movable die plate, two sets of ball-screw type feed mechanisms are provided in symmetrical positions.

Therefore, when the movable die plate is moved, the ball screw shafts must be rotated synchronously.

On the other hand, a toggle type mold clamping apparatus, in which the rotation of an electric motor is transmitted to a screw, and a nut threadedly engaging with the screw is used to convert the rotation into a straight movement, thereby driving a toggle mechanism, so that a fast movement operation of a working end of toggle mechanism is used for mold opening and closing, and a portion generating a great force close to the top dead center of the working end of toggle mechanism is used for mold clamping, has been used for an injection molding machine. This toggle type mold clamping apparatus is simple in construction and can be manufactured at a low cost. However, in order to develop a strong mold clamping force, the whole of the toggle mechanism must inevitably be robust. Therefore, although there is no problem in the case of a small-sized injection molding machine, the structural member is rather excessively large in the case of a large-sized injection molding machine. In this case, component parts such as an electric motor, ball screw, and ball screw nut are expensive as compared with standard parts, which provides an unexpected equipment.

The conventional ball-screw type feed mechanism, which advances and retreats the movable die plate toward and from the fixed die plate by means of a driving force of a servomotor, is usually provided in a pair at symmetrical positions on both sides of the mold clamping apparatus, and the synchronous speed thereof is controlled so that the rotational speed and rotational position of each ball screw shaft are prevented from shifting. However, when the positions of the paired ball screws shift during operation due to imbalance of load or asynchronism of speed control, or if a ball screw nut mounting portion is tilted by a mounting error occurring when the ball screw nut is assembled to the ball screw shaft, the ball screw shaft comes in unsymmetrical contact with the ball screw nut, and thus a bending force acts on the ball screw shaft from the ball screw nut. Therefore, the ball screw shaft may be damaged, or may be subjected to abnormal wear at an early stage.

Also, two sets of ball screw shafts and ball screw nuts are provided, two sets of servomotors and power transmitting mechanisms, which relate to the ball screw mechanisms, are provided, and the rotation of the two sets of ball screw shafts must be subjected to synchronous operation control, which results in a high cost. Also, when the ball screw shafts and ball screw nuts are installed on both sides of the movable die plate, the mechanism including the motor protrudes from the overall layout of injection molding machine, which increases the occupied floor area. Also, the ball screw nut is fixedly mounted to the movable die plate, the ball screw nut is affected by the deformation of die plate at the time of mold clamping.

DISCLOSURE OF THE INVENTION

An object of the present invention is to provide an electrically-operated mold opening/closing device in which a ball screw type feed mechanism for advancing and retreating a movable die plate toward and from a fixed die plate is simplified, the synchronous operation control of the rotational speed and rotational position of a ball screw shaft is not needed, a unsymmetrical contact or a bending force does not occur on the assembly of the ball screw shaft and a ball screw nut, and a shock load can be absorbed.

The present invention solves the above problems by construction means having features described in the following items.

(1) An electrically-operated mold opening/closing device for an injection molding, comprising a fixed die plate for holding a fixed mold; a movable die plate for holding a movable mold; means for advancing and retreating the movable die plate toward and from the fixed die plate; a tie bar for connecting the movable die plate to the fixed die plate after the movable die plate approaches the fixed die plate and the fixed mold and the movable mold are closed; die plate connecting means formed by a plurality of ring grooves provided on the tie bar, or a plurality of ring grooves which are provided so as to engage with threads and open and close in the direction perpendicular to the axis of the tie bar, or a half nut having threads; and mold clamping means used at the time of injection molding, characterized in that the means for advancing and retreating the movable die plate toward and from the fixed die plate comprises a moving base in which the upper surface thereof is connected integrally with the movable die plate and a slide unit is installed on the lower surface thereof; a pair of track rails which are provided on the base of the machine and form a linear guide by engaging with the slide unit; a ball screw shaft which is supported in parallel with the track rails by a bearing provided on the base of the machine and in which axial direction is restrained rotatably; a servomotor for driving the ball screw shaft; and a ball screw nut which is installed on the lower surface of the moving base so as to threadedly engage with the ball screw shaft, and the ball screw shaft and the ball screw nut are provided at an arbitrary position between the paired track rails for linear guide.

(2) The electrically-operated mold opening/closing device described in item (1), characterized in that the ball screw shaft and the ball screw nut are provided at a position close to one track rail between the paired track rails for linear guide.

(3) The electrically-operated mold opening/closing device described in item (1) or (2), characterized in that the construction of installation of the ball screw nut to the moving base comprises a connecting bracket which is installed to the moving base and has a through hole through which the ball screw shaft passes; a plurality of coned disc springs provided on both sides of the through hole of the connecting bracket; a coned disc spring case which houses the coned disc springs in a state of being urged; and the ball screw nut installed to the coned disc spring case, and the ball screw shaft and the ball screw nut are configured so that an unsymmetrical contact of a ball screw portion is prevented by the aligning action and the buffering action of the coned disc springs, and shocks are relaxed.

BEST MODE FOR CARRYING OUT THE INVENTION

Figure 1:
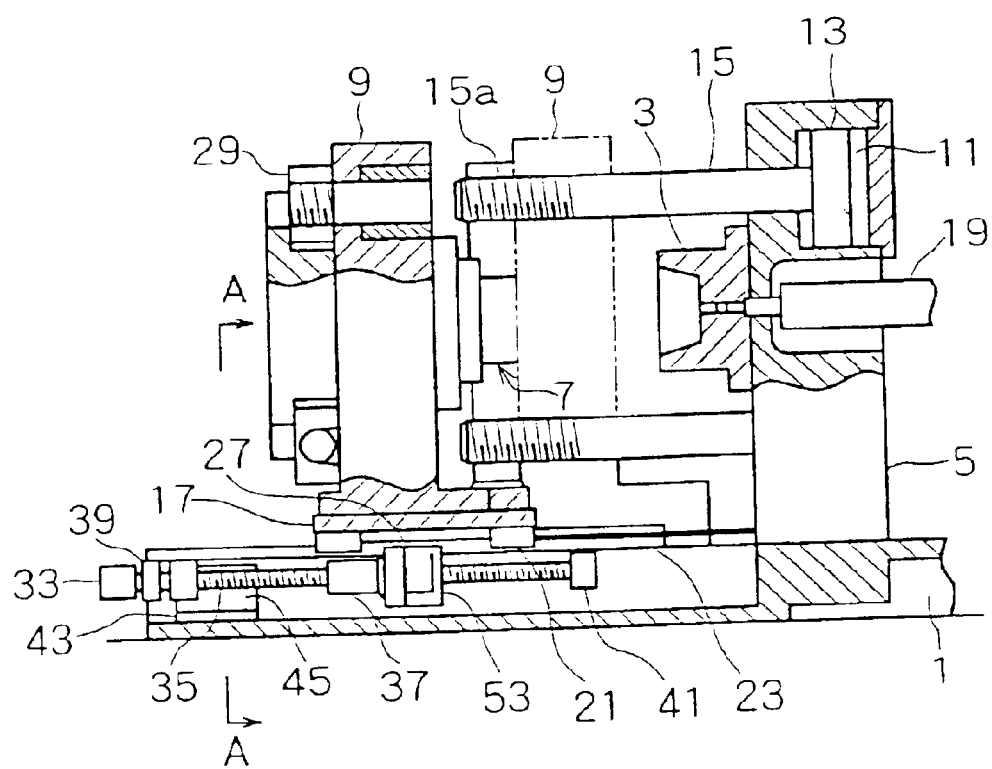
FIG. 1 is a side view (partially sectioned) of a mold clamping apparatus for an injection molding machine provided with an electrically-operated mold opening/closing device in accordance with an embodiment of the present invention.
Figure 2:
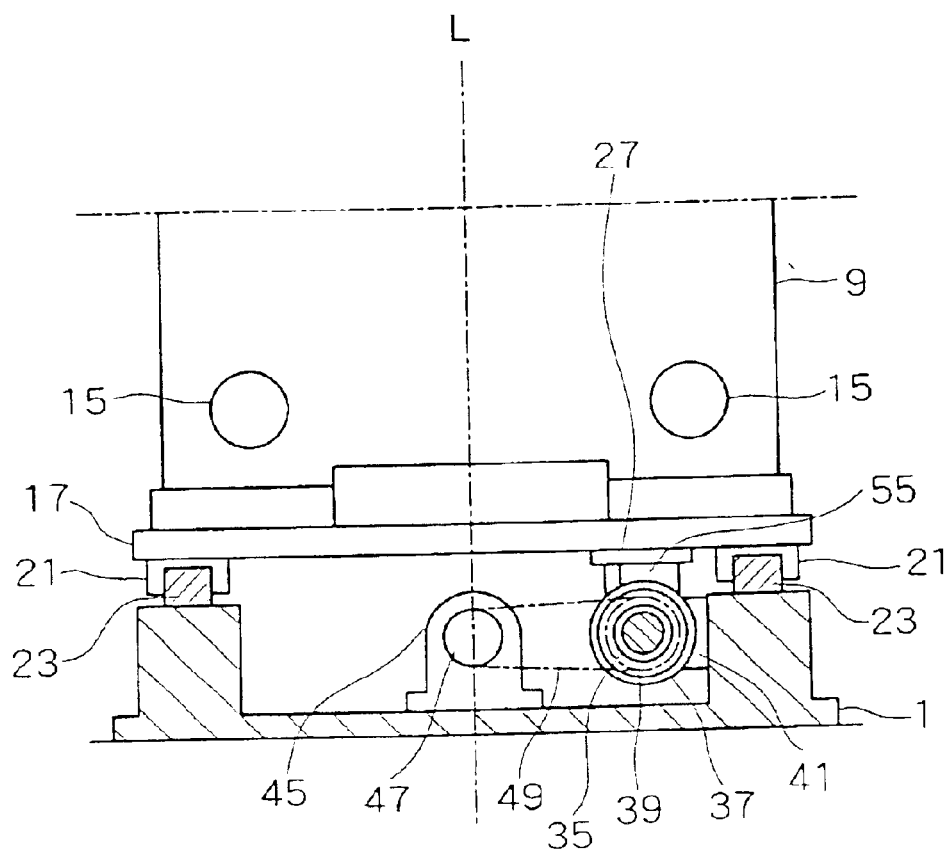
FIG. 2 is a sectional view taken along the line A—A of FIG. 1, showing the arrangement of a ball screw shaft.
Figure 3:
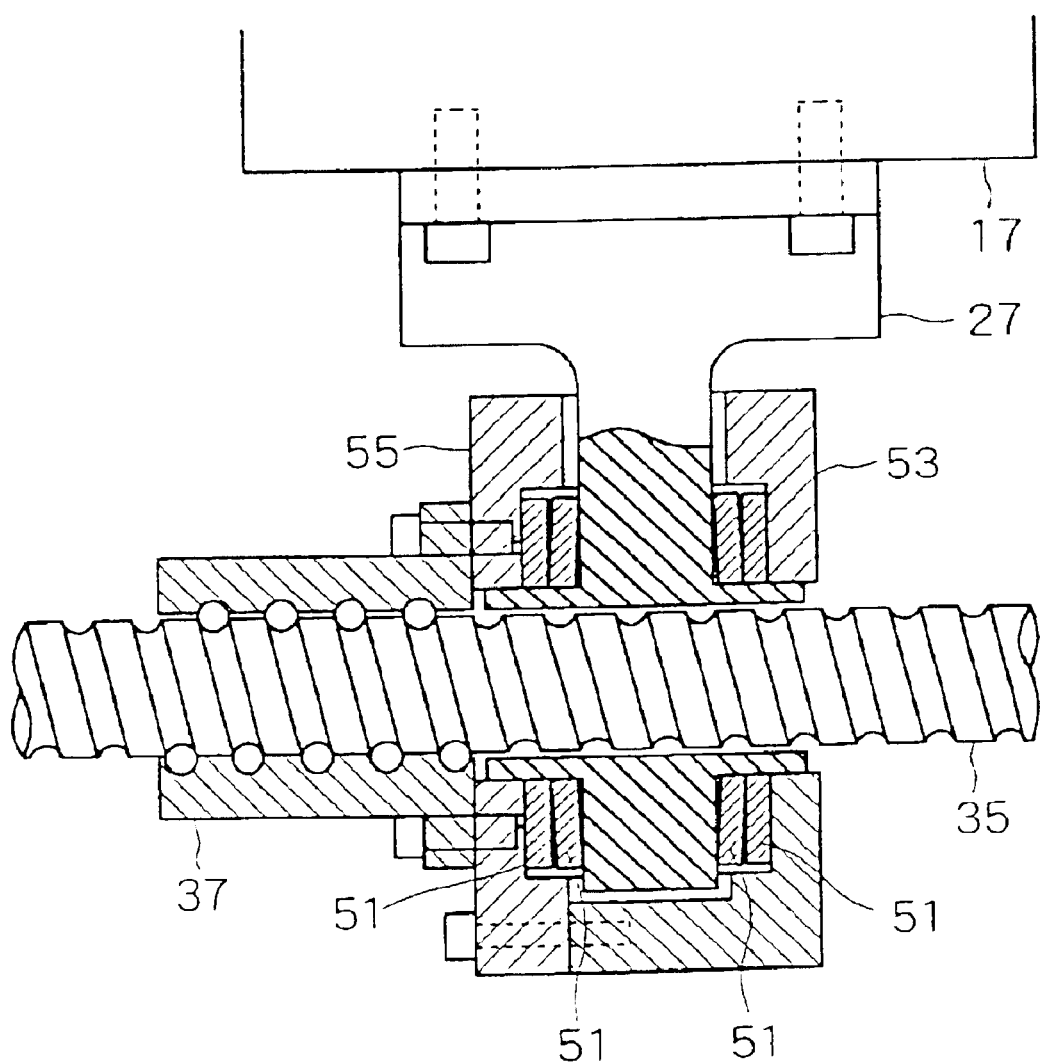
FIG. 3 is an enlarged side sectional view showing a mounting construction of a ball screw shaft and a ball screw nut of the electrically-operated mold opening/closing device shown in FIG. 1.

An embodiment of the present invention will be described with reference to the accompanying drawings. FIG. 1 is a side view (partially sectioned) of a mold clamping apparatus for an injection molding machine provided with an electrically-operated mold opening/closing device: FIG. 2 is a sectional view taken along the line A—A of FIG. 1, showing the arrangement of a ball screw shaft; and FIG. 3 is an enlarged side sectional view showing a mounting construction of a ball screw shaft and a ball screw nut of the electrically-operated mold opening/closing device shown in FIG. 1.

In FIG. 1, on a base 1 is fixedly provided a fixed die plate 5 mounted with a fixed mold 3. Also, on the base 1, track rails 23 for linear guide are provided. Slide units 21 for linear guide, which are guided by the track rails 23, are installed on the lower surface of a moving base 17 connected integrally with a movable die plate 9. The movable die plate 9 mounted with a movable mold 7 is arranged so as to be opposed to a fixed die plate 5 and is configured so as to be movable.

The fixed die plate 5 is provided with a plurality of (four in this example) hydraulic mold clamping cylinders having a short stroke and a large diameter. In this mold clamping cylinder 11, a large-diameter ram 13 moves slidingly. To this ram 13 is directly connected a tie bar 15. This tie bar 15 is arranged so as to be inserted through one of a plurality holes formed in the movable die plate 9 when the opposed movable die plate 9 comes close to the fixed die plate 5 to close the mold. In the distal end portion of the tie bar 15, a plurality of ring grooves 15a with an equal pitch are formed.

On the surface opposite to the mold attachment surface of the movable die plate 9, paired half nuts 29, which engage with the ring grooves 15a of the tie bar 15, are provided in such a manner as to hold the tie bar 15 therebetween so as to be operated in the perpendicular direction by a hydraulic cylinder etc. Reference numeral 19 denotes an injection cylinder. The two-dot chain line in FIG. 1 indicates a position of the movable die plate 9 at the time of mold closure.

As shown in FIG. 2, one ball screw shaft 35 is provided at a position shifting from the centerline L in the lengthwise direction of the injection molding machine. The ball screw shaft 35 is installed to the base 1, and is pivotally supported by a support 41 provided with a bearing and a support 43 so that the axial direction is restrained rotabably.

The ball screw shaft 35 is driven by a servomotor 45 via a pulley 47, a toothed belt 49, and a pulley 39. As shown in FIG. 3, a ball screw nut 37 is threadedly engaged with the ball screw shaft 35, and the ball screw nut 37 is installed on the lower surface of the moving base 17 by a connecting bracket 27 via coned disc springs 51. At the tip end of the ball screw shaft 35, an encoder 33 is provided to detect the rotation of the ball screw shaft 35. By controlling the number of revolutions and the position of rotation angle of the encoder 33 by using a controller, not shown, the travel speed and the stop position of the movable die plate 9 can be controlled.

Specifically, the reference position of the movable die plate 9, for example, a mold opening limit position is taken as a start point (position at which the number of revolutions or the rotation angle is zero) of rotation position of the encoder 33, by which the position of the ball screw nut 37 with respect to the ball screw shaft 35 (that is, the position of the movable die plate 9) can be designated by the number of revolutions (or the rotation angle) of the encoder 33. If the number of revolutions per unit time of the encoder 33 is converted into a travel distance, the travel speed of the movable die plate 9 can be shown.

The not illustrated controller, in advance, sets the travel speed and acceleration of the movable die plate 9, and converts these set values into the rotational speed and the rotational acceleration of the ball screw shaft 35 and stores the converted values. Therefore, when the movable die plate 9 is moved, the detected values of the rotational speed and the rotational acceleration of the ball screw shaft 35 detected by the encoder 33 are compared with the set values, and feedback control is carried out so that the rotational speed and the rotational acceleration of the ball screw shaft 35 coincide with the set values. Thereby, the travel speed and the acceleration of the movable die plate 9 can be controlled.

The mounting state of the ball screw nut 37 and the coned disc springs 51 will be described with reference to the expanded view of FIG. 3. In the connecting bracket 27 installed on the lower surface of the moving base 17, the ball screw shaft 35 is inserted with a gap so as to be aligned with the centerline of a through hole in the connecting bracket 27. On both sides of the connecting bracket 27, two coned disc springs 51 are provided on each side, that is, a total of four coned disc springs 51, are provided so as to be arranged back to back. These four cone disc springs 51 are housed in a spring chamber formed by a spring case 53 and a spring case cover 55. On the outside surface of the case cover 55 is fixedly provided the ball screw nut 37. The cone disc springs 51 are compressed and preloaded by the spring case 53 and the spring case cover 55, and the spring case 53 and the spring case cover 55 have a gap between them and the connecting bracket 27 around entire circumference.

Next, the operation of the electrically-operated mold opening/closing device will be described.

From a state in which the mold is open as shown in FIG. 1, that is, a state in which the movable die plate 9 is sufficiently separate from the fixed die plate 5 as indicated by the solid line to a state in which the fixed mold 3 and the movable mold 7 are closed, the movable die plate 9 is moved by the rotation of the ball screw shaft 35 driven by the servomotor 45. The not illustrated controller accelerates the movable die plate 9 slowly, and after moving it at a fixed speed, decelerates it and stops it just before the movable mold 7 comes into contact with the fixed mold 3.

The half nuts 29 are operated at the stop position of the movable die plate 9, and the inside ring grooves of the half nuts 29 engage with the ring grooves 15a of the tie bar 15, by which the half nuts 29 are connected to the tie bar 15. Next, a pressure oil is fed into the mold clamping cylinder 11, so that mold clamping is performed, and molten resin is injected into the mold cavity. The molten resin in the cavity is cooled and solidified into a molded product. After cooling and solidification, a pressure oil is fed on the side opposite to the working side of the mold clamping cylinder to push out the ram 13, thereby releasing the mold through a small distance. At this stage at which the mold clamping force is released, the half nuts 29 operate reversely to disconnect the tie bar 15 from the half nuts 29, and the ball screw shaft 35 rotates in the direction opposite to the above-described direction, so that the movable mold 7 and the movable die plate 9 are moved and stopped at the original position. After the molded product is taken out, the next mold closing operation starts.

The following is a description of the operation of the mounting portion in which the coned disc springs 51 are used for the ball screw nut 37 threadedly engaging with the ball screw shaft 35.

The ball screw shaft 35 is provided at a position shifted from the centerline L in the lengthwise direction of the injection molding machine, and the moving base 17 on which the movable die plate 9 is placed is securely guided by the highly rigid track rails 23 for linear guide and the slide units 21 on both sides, so that at the time of mold opening and closing, no load is applied except the inertia load and frictional load caused by the weight of the movable die plate 9. Therefore, the movable die plate 9 does not tilt. However, a mounting error may occur for some reason when the ball screw shaft 35 and the ball screw nut 37 are assembled to each other. Thereby, when the mounting portion of the ball screw nut 37 is tilted and comes into unsymmetrical contact with the ball screw shaft 35, the coned disc springs are deflected, so that the offset load is relaxed. Therefore, a bending force acting on the ball screw shaft 35 from the ball screw nut 37 can be avoided.

Also, by the gap provided between the connecting bracket 27 and the spring case 53 and spring case cover 55 around entire circumference, the offset load caused by unsymmetrical contact can be avoided because no contact occurs even when the mounting accuracy such as horizontality and parallelism of the ball screw shaft 35 is poor or when the shaft deflection is great.

The means for advancing and retreating the movable die plate toward and from the fixed die plate in the electrically-operated mold opening/closing device in accordance with the present invention includes the moving base in which the upper surface thereof is connected integrally with the movable die plate and the slide units for linear guide are installed on the lower surface thereof, the paired track rails for linear guide provided on the base of this machine, one ball screw shaft which is supported so that axial direction is restrained rotatably by a bearing provided on the base of this machine, a servomotor for driving the ball screw shaft, and a ball screw nut which is installed on the moving base and threadedly engages with the ball screw shaft, and the ball screw shaft and the ball screw nut are provided at an arbitrary position between the paired track rail for linear guide, especially at a position shifting toward one track rail avoiding the central portion. Therefore, the ball screw shaft, the ball screw nut, the servomotor, etc. are housed in the base of this machine, so that the mounting area of equipment can be reduced, and at the same time, a sufficient usable space can be provided under the movable die plate. This achieves effects of easily removing a molded product which is dropped mistakenly and facilitating work at the time of maintenance. Also, as compared with the case where two sets of ball screw shafts and ball screw nuts are provided, the present invention achieves effects of reducing the number of parts, making the synchronous control of the number of revolutions of the ball screw shafts unnecessary, and reducing the cost (claims 1 and 2).

Although the ball screw shaft is provided at a position shifting from the centerline in the lengthwise direction of the injection molding machine, the movable base on which the movable die plate is placed is securely guided by the highly rigid linear guide on both sides, so that at the time of mold opening and closing, no load is applied except the inertia load and frictional load caused by the weight of the movable die plate. Therefore, the offset load on the linear guide caused by imbalance of load amount is slight, and thus the load capacity of linear guide is not affected. Also, even if the mounting portion of ball screw nut is tilted and is brought into unsymmetrical contact with the ball screw nut by a mounting error etc. occurring when the ball screw shaft and the ball screw nut are assembled to each other, the coned disc springs deflect, aligning action taking place, and the offset load is relaxed. Therefore, a bending force acting on the ball screw shaft from the ball screw nut can be avoided. Further, in the mold clamping process, when the movable die plate is deformed slightly, a load is not applied directly to the ball screw shaft and the ball screw nut, and the coned disc springs are deflected, so that action from the ball screw nut to the ball screw shaft can be avoided. Also, if an unexpected load acts impulsively, the coned disc springs can absorb the deflection shock load, and an effect of protecting the ball screw nut and the ball screw shaft is achieved (claim 3)

Also, by the gap provided between the connecting bracket and the spring case and spring case cover around entire circumference, the offset load caused by unsymmetrical contact can be avoided because no contact occurs even when the mounting accuracy such as horizontality and parallelism of the ball screw shaft is poor or when the shaft deflection is great.

INDUSTRIAL APPLICABILITY

As described in detail above, according to the electrically-operated mold opening/closing device, the ball screw type feed mechanism for advancing and retreating the movable die plate toward and from the fixed die plate is simplified, and the synchronous operation control of the rotational speed and rotational position of the ball screw shaft is not needed. Also, a unsymmetrical contact or a bending force does not occur on the assembly of the ball screw shaft and the ball screw nut, and a shock load can be absorbed.

What is claimed is:

1. An electrically-operated mold opening/closing device for an injection molding, comprising a fixed die plate for holding a fixed mold; a movable die plate for holding a movable mold; means for advancing and retreating said movable die plate toward and from said fixed die plate; a tie bar for connecting said movable die plate to said fixed die plate after said movable die plate approaches said fixed die plate and said fixed mold and said movable mold are closed; die plate connecting means; and mold clamping means used at the time of injection molding, characterized in that said means for advancing and retreating said movable die plate toward and from said fixed die plate comprises a moving base in which the upper surface thereof is connected integrally with said movable die plate and a slide unit is installed on the lower surface thereof; a pair of track rails which are provided on a base of said machine and form a linear guide by engaging with said slide unit; a ball screw shaft which is supported in parallel with said track rails by a bearing provided on the base of said machine and in which axial direction is restrained rotatably; a servomotor for driving said ball screw shaft; and a ball screw nut which is installed on the lower surface of said moving base so as to threadedly engage with said ball screw shaft, and said ball screw shaft and said ball screw nut are provided at a position between said paired track rails;

further comprising means for relaxing a bending force due to a misalignment of the ball screw nut and the ball screw shaft.

2. The electrically-operated mold opening/closing device according to claim 1, characterized in that said ball screw shaft and nut are provided at a position closer to one of said track rails than the other of said track rails.

3. The electrically-operated mold opening/closing device according to claim 1, characterized in that the construction of installation of said ball screw nut to said moving base comprises a connecting bracket which is installed to said moving base and has a through hole through which said ball screw shaft passes; a plurality of coned disc springs provided on both sides of the through hole of said connecting bracket; a coned disc spring case which houses said coned disc springs in a state of being urged; and the ball screw nut installed to said coned disc spring case, wherein said disc spring case said connecting bracket are separated by a gap around the circumference of the disc spring case.

4. The electrically-operated mold opening/closing device according to claim 2, characterized in that the construction of installation of said ball screw nut to said moving base comprises a connecting bracket which is installed to said moving base and has a through hole through which said ball screw shaft passes; a plurality of coned disc springs provided on both sides of the through hole of said connecting bracket; a coned disc spring case which houses said coned disc spring in a state of being urged; and the ball screw nut installed to said coned disc spring case.

5. The electrically-operated mold opening/closing device according to claim 1, wherein said die plate connecting means comprises a plurality of ring grooves provided on said tie bar.

6. The electrically-operated mold opening/closing device according to claim 1, wherein said die plate connecting means comprises a plurality of ring grooves which are provided so as to engage with threads and close in the direction perpendicular to the axis of said tie bar.

7. The electrically-operated mold opening/closing device according to claim 1, wherein said die plate connecting means comprises a half nut having threads.

\* \* \* \* \*